United States Patent [19]

Schneider et al.

[11] Patent Number: 5,236,500
[45] Date of Patent: Aug. 17, 1993

[54] HOMOGENEOUS COMPOSITION OF CEMENTITIOUS AND TAR COMPONENTS AND PROCESS FOR FORMING SHAPED ARTICLES THEREFROM

[76] Inventors: John F. Schneider; Kurt A. Schneider, both of 3956-200th St. East, Farmington, Minn. 55024

[21] Appl. No.: 887,316

[22] Filed: May 22, 1992

Related U.S. Application Data

[63] Continuation-in-part of Ser. No. 578,882, Sep. 7, 1990, Pat. No. 5,116,420.

[51] Int. Cl.$^5$ .............................................. C04B 22/16
[52] U.S. Cl. .................................... 106/640; 106/648; 106/655; 106/668; 106/671; 106/705; 106/709; 106/724; 106/763
[58] Field of Search ............... 106/640, 648, 655, 608, 106/671, 705, 709, 713, 724, 763

[56] References Cited

U.S. PATENT DOCUMENTS

| | | | |
|---|---|---|---|
| 4,544,690 | 10/1985 | Ladish | 524/60 |
| 4,930,428 | 6/1990 | Schneider et al. | 106/640 |
| 5,116,420 | 5/1992 | Schneider et al. | 106/640 |

OTHER PUBLICATIONS

Kosmatka et al., "Design and Control of Concrete Mixtures"; Thirteeth Edition, Portland Cement Association, 1988, pp. 53, 55-59 and 74-75.

*Primary Examiner*—Mark L. Bell
*Assistant Examiner*—Michael Marcheschi
*Attorney, Agent, or Firm*—Merchant, Gould, Smith, Edell, Welter & Schmidt

[57] ABSTRACT

Improved cementitious compositions having increased flexural, tensile and shear-bond strength, increased wear resistance, decreased water permeability and enhanced workability than previous cement compositions, which are prepared with water treated with an emulsified tar component, and preferably a residual amount of sodium tripolyphosphate, are provided. Methods of forming shaped articles therefrom are also provided.

18 Claims, No Drawings

HOMOGENEOUS COMPOSITION OF CEMENTITIOUS AND TAR COMPONENTS AND PROCESS FOR FORMING SHAPED ARTICLES THEREFROM

CROSS-REFERENCE TO RELATED APPLICATIONS

This application is a Continuation-In-Part of U.S. application Ser. No. 07/578,882, filed Sep. 7, 1990 and will issue as U.S. Pat. No. 5,116,420 dated May 26, 1992.

FIELD OF THE INVENTION

The present invention is directed to improved cementitious compositions having increased flexural, tensile and shear-bond strength, increased wear resistance, decreased permeability, and enhanced workability than previous cement compositions. More particularly, the invention is directed to cementitious compositions prepared with an aqueous premix containing an emulsifier system and tar component and to methods of forming shaped articles therefrom. Preferably, the aqueous premix used to prepare the cementitious compositions also contains a residual amount of sodium tripolyphosphate.

BACKGROUND OF THE INVENTION

Inorganic cements exhibit characteristic properties of setting and hardening when mixed with water to form a paste. They are capable of joining rigid solid masses into coherent structures. Inorganic cements can be divided into hydraulic and nonhydraulic types according to the way in which they set and harden. For example, hydraulic cements are capable of setting and hardening in air and under water, whereas nonhydraulic cements are only capable of hardening in air. See Z. D. Jastrebski, *The Nature and Properties of Engineering Materials*, 2d. Ed., John Wiley & Sons, New York (1977) at 356, the disclosure of which is incorporated by reference herein.

The most widely-used hydraulic cement is so-called Portland cement, which is obtained by heating an intimate mixture, composed mainly of calcareous and argillaceous materials, or other silica, alumina, and iron-oxide bearing materials, at a clinkering temperature of about 1400° C. The partially sintered material, called clinker, is then ground to a very fine powder. After mixing with water, a hardened amorphous mass is formed consisting primarily of calcium-silicate hydrate (C—S—H) which, like other gels, contains a network of capillary pores and gel pores. The total porosity of a typical hardened Portland cement paste is about 30–40% by volume, having a very wide pore-size distribution ranging from 10–0.002 $\mu$m in diameter. The gel porosity, consisting of very small pores, below 0.01 $\mu$m, is about 26%, with the remaining porosity due to capillary network. See Z. D. Jastrebski, supra, at 356–61.

Portland cement formulations may also contain additional additives. For example, small amounts of calcium sulfate in the form of gypsum or anhydrite are added during grinding of the raw materials to control the setting time and enhance strength development of Portland cement. Cement pastes are sometimes impregnated with liquid organic monomers or liquid sulfur and polymerized to produce polymer-impregnated concrete. See 5 *Kirk-Othmer Encyclopedia of Chemical Technology*, 3rd. ed., John Wiley & Sons, New York (1978) at 163, the disclosure of which is incorporated by reference herein. Other additives include water reducers, plasticizers, air entrainment and anti-foaming additives, silica fines, fly ash, polymer latexes and the like.

Previously, in Applicants' U.S. Pat. No. 4,930,428, the disclosure of which is herein incorporated by reference, a high strength concrete composition formed from water treated with about 0.5 to 100 parts per million (ppm) residual sodium tripolyphosphate (STP) was described. Surprisingly, the concrete composition was found to exhibit higher strength, density, and lesser porosity than conventional concrete compositions. This composition is a significant improvement over conventional concrete. However, as with conventional concrete, several disadvantageous properties remain.

Conventional concrete is not flexible or elastic. Thus, when conventional concrete is subjected to compressive, flexural, tensile and/or shearing forces, it breaks or cracks after undergoing relatively minor deformation. In addition, conventional concretes are relatively permeable and porous, and accordingly, often transport and retain a high degree of trapped moisture.

The tendency of conventional concrete to retain moisture can present particular problems in hot or cold climates. For example, moisture trapped in concrete during a period of freezing temperatures will expand and form ice crystals which often crack the concrete. This phenomenon, referred to as frost damage is particularly prevalent in areas subject to multiple freeze-thaw cycling. In such areas, the usable life of conventional concrete is often greatly reduced by this phenomenon. Furthermore, in an effort to overcome the tendency of conventional concrete to break or crack in these climates, conventional concrete is air entrained by the addition of various additives which increase the trapped air in the composition.

The relatively high permeability of conventional concrete also limits the varieties of fly ash which can be added to the compositions. For example, only so called "clean" fly ashes, such as those obtained from coal-fired power plants can be employed in conventional concrete mixtures. Fly ashes, which may contain organic or inorganic contaminants, such as those which are obtained from the combustion of refuse, cannot be employed, since such contaminants have a tendency to leach out of conventional concrete when it is subjected to rain or melting snow.

Finally, conventional concrete can be difficult to work with. After being poured, conventional concrete often requires significant screeting and troweling to obtain a smooth, usable surface. Furthermore, the tendency of conventional concretes to "bleed" water to the surface of the mass often aggravates the ability to obtain a smooth surface. In fact, if the surface of the concrete is troweled too extensively, it will dry to a loose, powdery mass which must be replaced.

Therefore, there is a need for cementitious compositions which exhibit substantially greater flexural, tensile and shear-bond strength, decrease permeability and which provide enhanced workability relative to cement compositions currently available.

There is also a need for methods of improving the flexural, tensile and shear-bond strength, and other desired properties of cementitious compositions and articles made from these compositions.

Accordingly, it is an object of the present invention to provide cementitious compositions which are substantially more flexible, tensile and shear resistant, less permeable, and provide enhanced workability than cement compositions previously known. Furthermore, it is an object of the present invention to also provide cementitious compositions which, through the preferred addition of sodium tripolyphosphate, also display many of the advantageous properties described in Applicant's U.S. Pat. No. 4,930,428.

In addition, it is also an object of the present invention to provide an aqueous premix for use in improving the flexural, tensile and shear-bond strength, as well as other desired properties, of cementitious compositions.

Finally, it is also an object of the present invention to provide a method of manufacturing shaped articles from the above compositions.

SUMMARY OF THE INVENTION

The forgoing objects are accomplished by a cementitious composition formed from a mixture of the following ingredients: about 0 to about 85 percent by weight of aggregate, about 7 to about 90 percent by weight of dry cement, about 3 to about 10 percent by weight of aqueous premix, and about 0 to about 50 percent by weight of fly ash, the percentages by weight being relative to the weight of the total composition, and the ratio of the aqueous premix to dry cementitious materials (i.e. dry cement and fly ash) being sufficient to give a castable mix. The aqueous premix is a highly dispersed mixture of water, an emulsifier system and a tar component, wherein the tar component constitutes from about 0.10 to 25.0 weight percent of the aqueous premix. In addition, the aqueous premix preferably contains from about 0.5 to about 500 and preferably up to about 180 parts per million of residual sodium tripolyphosphate.

The present invention is also directed to an aqueous premix for concrete formed from a mixture of the following ingredients: about 0.05 to about 15.0 percent by weight of an emulsifier system, from about 0.10 to about 25.0 percent by weight of a tar component, and about 65 to about 99 percent by weight of water, wherein the weight percents of the ingredients are relative to the total weight of the premix. In addition, the premix preferably contains the above-mentioned 0.5 to about 500 ppm proportion of residual sodium tripolyphosphate.

The premix constitutes a substantially uniformly distributed dispersion of the tar component in water. Preferably, it is of colloidal dimensions and especially preferably, it is substantially stable against settling, separating or otherwise becoming a non-disperse mixture.

In addition, the present invention is also directed to a process for manufacturing a cementitious shaped article. The process includes the steps of mixing water with the emulsifying system and the tar component in appropriate proportions as mentioned above to form an aqueous premix; forming a fluid cementitious mixture by mixing the aqueous premix with aggregate, dry cement, and optional fly ash; pouring the fluid cementitious mixture into a casing; and allowing the mixture to harden into the cementitious shaped article. In addition, the process for manufacturing cementitious shaped articles preferably will include mixing sodium tripolyphosphate in the aqueous premix, such that the water is softened, and the residual proportion of sodium tripolyphosphate mentioned above remains in the aqueous premix.

A further object of the present invention is to provide a process for increasing the flexural, tensile and shear-bond strength, while decreasing the permeability of a cement composition. The process includes the step of forming the cement composition from a combination of dry cementitious ingredients and the aqueous premix containing water, the emulsifier system and the tar component in the proportions mentioned above. In addition, it is preferred that the aqueous premix further contain an appropriate proportion of residual sodium tripolyphosphate as mentioned above.

A further improvement of the cementitious composition of the present invention is accomplished by combination of elemental carbon in any form with the cementitious composition of basic ingredients including aggregate, dry cement and aqueous premix as described above. The elemental carbon can substitute for a portion of the fly ash and/or aggregate. Alternatively, it may be added in addition to the fly ash and/or aggregate. The proportions of the various ingredients are essentially similar to those for the basic cementitious composition: aggregate from about 0 to 85%-wt, dry cement from about 7 to about 90%-wt, aqueous premix of about 3 to about 10%-wt, fly ash about 0 to about 50%-wt, and elemental carbon in amount from about 0.01%-wt to 5%-wt. The weight percentages are relative to the weight of the total composition.

Finally, the present invention also provides a shaped article formed by a process including the steps of mixing water with the emulsifier system and the tar component to form the aqueous premix in the appropriate proportions mentioned above; forming a fluid cementitious mixture by mixing the appropriate, above-mentioned proportions of the aqueous premix with aggregate, dry cement and fly ash; and pouring the fluid cementitious mixture into a casing so that the mixture hardens into a shaped article. As with the previous embodiments, preferably the aqueous premix further contains from an appropriate, above-mentioned proportion of residual sodium tripolyphosphate.

Advantageously, the processes and cementitious compositions and shaped articles formed therefrom according to the present invention exhibit surprisingly increased flexural, tensile and shear-bond strength, increased wear resistance, decreased permeability or enhanced workability over cement compositions or concretes not incorporating an emulsified tar component and preferably a residual amount of sodium tripolyphosphate.

Also advantageously, the cementitious composition formed with elemental carbon displays significantly higher strength and a more complete and uniform air void structure relative to standard concrete. The improved strength and air void properties of the improved cementitious composition containing elemental carbon confer advantageous properties upon the poured concrete and shaped articles prepared therefrom. This improved composition displays better freeze thaw performance, better durability and a less water permeability than ordinary concrete.

DETAILED DESCRIPTION OF THE INVENTION

The present invention provides a cementitious composition produced from a mixture of dry cement, aggregate, optional fly ash and a tar component in an aqueous solution (aqueous premix). In a preferred aspect, the aqueous premix also contains a residual amount of sodium tripolyphosphate (STP). More particularly, the present cementitious composition is formed from a combination of ingredients including about 0–85 weight percent aggregate, about 7–90 weight percent dry cement, about 3–10 weight percent of aqueous premix, and about 0–50 percent fly ash. Preferably, the combination of ingredients includes about 30–85 weight percent aggregate, about 7–70 weight percent dry cement, about 6–9 weight percent aqueous premix, about 1–30 weight percent fly ash and preferably about 0.2–1.5 weight percent elemental carbon particulate, more preferably about 0.05 weight percent of such particulate. More preferably, the combination of ingredients includes about 70–82 weight percent aggregate, about 9–25 weight percent dry cement, about 5–9 weight percent aqueous premix, and about 1–4 weight percent fly ash. An especially preferred combination of ingredients contains about 75–80 weight percent aggregate, about 10–15 weight percent dry cement, about 6–8 weight percent aqueous premix, and about 2–3 weight percent fly ash.

The "aqueous premix" is produced by first adding an emulsifier system and then the tar component to the water to be mixed with the dry, cementitious ingredients of the composition, i.e. the aggregate, dry cement, and optional fly ash. Preferably, the tar component constitutes from about 0.1–25.0 weight percent of the aqueous premix, more preferably from about 5.0–12.5 weight percent, and most preferably about 7.0–9.0 weight percent of the aqueous premix component of the present invention. Expressed as a percent by weight of the total composition, the tar component is from about 0.01–1.7 weight percent, more preferably from about 0.3–0.8 weight percent, and most preferably about 0.6–0.7 weight percent of the total weight of the composition.

The emulsifier system includes one or more primary emulsifying, surfactant or dispersing agents as well as optional secondary agents in amounts sufficient to produce a substantially uniform, extremely fine macromolecular dispersion of the tar component in the water. Preferably, the emulsifier system is about 0.05 to about 15.0 weight percent, more preferably about 0.1 to about 12 weight percent, most preferably about 1 to about 10 weight percent relative to the weight of the premix.

Further, the aqueous premix utilized in the present invention also will preferably contain an excess of STP over the amount that is effective to soften the water to be mixed with the tar component, emulsifier system and dry, cementitious ingredients of the composition. The addition of excess STP produces an aqueous premix having a residual amount of STP, preferably at about 0.5–500 or more, preferably up to about 180 parts per million (ppm). More preferably, the aqueous premix will contain about 15–22 ppm residual STP and most preferably, about 18–60, especially preferably about 35–45 ppm residual STP.

Sodium tripolyphosphate ($Na_5P_3O_{10}$), a widely-used water-softening agent, is the sodium metal salt of an anion of the general formula $[P_nO_{3n+1}]^{(n+2)-}$, where $n=3$. Sodium tripolyphosphate (STP) is a linear polyphosphate which can be prepared by the molecular dehydration of mono- and disodium phosphates. See The Merck Index, 10th Ed., M. Windholz et al., eds., Merck & Co. (1983) at Entry 8544, the disclosure of which is incorporated by reference herein. For the purposes of this invention, it is desirable to combine this polymeric form of STP into the aqueous premix before incorporating the tar component, emulsifier system and dry ingredients.

As used herein, the tar component can be any combination of a variety of bituminous materials as defined in American Society for Testing and Materials (ASTM) Standard D8-89, the disclosure of which is herein incorporated by reference, which are composed of mixtures of various polynuclear aromatic compounds. Suitable bituminous materials which may be used for the formulation of the aqueous premix include, without limitation, petroleum asphalt derived from refining processes (e.g., straight reduced asphalt, thermal cracked asphalt, airblown asphalt, propane precipitated asphalt), native asphalt with varying mineral contents (e.g., Gilsonite, graphamite, glance pitch, Bermudez and Trinidad deposits), heavy oil rubber incorporated bitumens (i.e., rubber dispersed in any of the present bituminous materials), resin incorporated bitumens (i.e., resin dispersed into any of the present bituminous materials), coal tars, oil tars, pitches, tall oil pitches and other pyrogenous tar distillates and associated derivatives from water-gas, wood, peat, bone, shale, rosin and fatty acid tars. In addition, it will be appreciated that any source of polynuclear aromatic compounds, whether natural or synthetic, is considered within the scope of the present invention. Examples include polybiphenyls, fused anthracene compounds, phenanthracene compounds, benzo-substituted naphthalene, acenaphthalene and similar polyaromatic liquid, viscous liquid or solid compounds.

Particularly preferred bituminous materials according to the present invention are coal tars and their derivatives, which are viscous black to brown liquids resulting from the destructive distillation of bituminous coal at temperatures ranging between 450°–1200° C. For a more thorough discussion of the manufacture and composition of coal tars, see 19 *Kirk-Othmer Encyclopedia of Chemical Technology*, 653–682 (2nd ed. 1969), the disclosure of which is incorporated herein by reference.

The emulsifier system of the aqueous premix according to the present invention contains a sufficient amount of a primary emulsifying, surfactant or dispersing agent to disperse the bituminous materials into the water of the aqueous premix component so as to form an "oil-in-water type emulsion". In general, primary emulsifying agents utilized with the bituminous materials can be one or more anionic, cationic or nonionic surface active agents which are incorporated as a total mixture at the proportions mentioned above for the emulsifying system. Furthermore, secondary agents including various clays such as bentonite montmorillonite, illite, atapulgite, fullers earth, diatomite, kaolin and zeolite can optionally be combined into the premix to serve as shearing, bulking, dispersing and emulsifying agents. The weight percentages of clay relative to the premix weight will range from about 0 to 80, preferably about 10 to 40, most preferably about 25 percent, this weight percentage being in addition to the weight percentage of 0.01 to 25 percent apportioned for the primary emulsifier, surfactant or dispersing agent. Acids, alkalis, salts, higher fatty acids, protective colloids or the like in appropriate functional amounts relative to the amount of primary emulsifier present can also be used to emulsify bituminous materials in water in conjunction with the primary emulsifiers. In general, an acid is used primarily with cationic and/or nonionic surface active agents; an alkali is used primarily with anionic and/or nonionic surface active agents; and salts can be utilized with all classes of surface active agents. Furthermore, the higher fatty acids may also contribute to the emulsification of the bituminous materials.

Examples of cationic emulsifiers include mainly higher alkyl alkylene polyamines, higher alkylamines, higher alkyl polyaminoethylene imidazolines, the polyethoxylated or polyaminoimidazoline derivatives of these compounds and the acid salts and quaternary ammonium salts of the above-mentioned polyamine compounds.

Cationic emulsifiers can also be used in conjunction with a nonionic emulsifier. In addition, acids such as hydrochloric acid, sulfonic acid, acetic acid and the like, and water-soluble salts such as the halides of the alkali metals and alkaline earth metals and the like may also be used in conjunction with these cationic emulsifiers. Furthermore, protective colloids such as methyl cellulose, hydroxyethyl cellulose, polyvinyl alcohol, gelatin, a salt of a lignin amine, a polyoxyethylene polypropylene glycol ether or the like can also be utilized.

Examples of typical anionic emulsifiers include alkali salts of casein, fatty acid soaps, alkali salts of a sulfuric acid ester of a higher alcohol, sodium alkylbenzene sulphonate, sodium alkylnapththalene sulphonate, polyoxyethylene sulphonate, polyoxypropylene sulphonate the mixed polymers thereof the di and tri sulphonate derivatives thereof and similar carboxy or sulfonoxy functionalized fatty compounds. Alkalis such as NaOH, KOH, NH$_4$OH and water-soluble salts of an alkali metal may be used in conjunction with the above anionic emulsifiers.

Examples of nonionic emulsifiers include polyoxyethylene higher alcohol ethers, polyoxyethylene alkyl phenyl ethers, polyoxyethylene fatty acid esters, polyoxyethylene alkyl ethers, glycerin fatty acid esters, propylene glycol fatty esters, sorbitan fatty acid esters, polyoxyethylene sorbitan fatty esters, polyoxyethylene oxypropylene block polymers and the like. In addition, the same acids, alkalis, salts or protective colloids as can be used in cationic or anionic emulsions may be used with a nonionic emulsion. Examples of protective colloids which can be utilized with nonionic emulsifiers include carboxymethyl cellulose, methyl cellulose, hydroxyethyl cellulose, polyvinyl alcohol, lignin sulphonate, polyoxyethylene polypropylene glycol ether and the like.

Preferred emulsifiers of the preferred coal tar bituminous materials according to the present invention include the anionic surfactants or emulsifiers such as the mono, di and trisulphonated fatty acids or alcohols as well as the mono, di and tri-sulphonated polyethoxy, polypropoxy and mixed polymer compounds. Particularly preferred among these are the anionic emulsifiers, either alone, or in combination with less than a majority proportion of the nonionic polyethoxy, polypropyl and polyetholypropoly alcohols and esters mentioned above.

In addition to the tar component, emulsifier system and water, the aqueous premix according to the present invention may also contain other additives. For example, the tar component may also include smaller quantities of an acrylonitrile, butadiene or styrene copolymer or other rubberizing agents, as well as various wetting, pigmentation and setting agents.

A particular embodiment of the combination of tar component and primary and secondary emulsifying agents utilized in the premix of present invention is commercially available in the form of driveway, pavement or roofing sealant compositions. For example, coal tar pitch emulsions are commercially available from a wide variety of sources, including without limitation, Koch Industries, Inc. of Wichita, Kansas, American Stone-Mix, Inc. of Baltimore, Maryland, The Brewer Company of Cincinnati, Ohio and Seal Master Corporation of Kent, Ohio. In addition, it will be appreciated that other commercially available bituminous emulsions, which are also employed as driveway, pavement or roofing sealers, can be utilized as the tar component in the cementitious compositions of the present invention.

When employing commercially available coal tar emulsions to form the aqueous premix utilized in the compositions according to the present invention, it is preferred that an emulsion containing from about 20–80 weight percent solids, preferably 40–70 weight percent solids, and most preferably about 50 weight percent solids be employed. The solid components of these commercial emulsions typically include tar pitch solids and various clay particles, which are primarily aluminous silicates, in approximately equal proportions. Thus, from about 20–80 weight percent, and preferably 50 weight percent of the commercial coal tar emulsion is water.

In utilizing a commercial coal tar emulsion to prepare the aqueous premix component of the present invention, it will be appreciated that approximately 50 weight percent of the commercial emulsion is water and 50 weight percent contains the solid components, with only 50 weight percent of these solids being the preferred emulsified coal tar component, and the other solid component being composed primarily of various clays. Accordingly, it will be further appreciated that appropriate adjustments are to be made in the formulations of the cementitious compositions of the present invention to ensure that the preferred amounts of water and tar component are incorporated therein. For example, in contrast to a concentrated emulsified coal tar, the volume of water already present in the commercial coal tar emulsion is appropriately considered when calculating the total volume of water needed to form the aqueous premix component of the present invention.

The "dry cement" of the present invention is the common, dry, powdery cementitious starting material or "dry mix" that is typically mixed with water to form a cement paste. The present composition includes about 7–90 weight percent of dry cement, preferably about 9–15 weight percent. In one embodiment, the ratio of dry cement to aqueous premix is about 4:1 to about 1:1, preferably about 2:1 to about 1.5:1, under conditions adjusted so that the amounts of dry cement and remaining ingredients are sufficient to provide the slurry flow properties appropriate to form a castable mix.

The dry cement to be mixed with the aqueous premix is preferably of the type known as Portland cement, but may include any conventional dry cement, including those defined in American Society for Testing and Materials (ASTM) Standard C-150, the disclosure of which is herein incorporated by reference. While any of the commercially available Portland cements can be conveniently used, a preferred chemical composition of a dry Portland cement useful in the present high-strength cement composition is the Type I mixture of Portland cement shown in Table 1 below:

TABLE 1

| Dry Portland Cement Composition | |
|---|---|
| Component | Approximate Weight % |
| Tricalcium silicate (3CaO.SiO$_2$): | 45–50 |
| Dicalcium silicate (2CaO.SiO$_2$): | 22–27 |
| Tricalcium aluminate (3CaO.Al$_2$O$_3$): | 10–15 |

TABLE 1-continued

Dry Portland Cement Composition

| Component | Approximate Weight % |
| --- | --- |
| Tetracalcium aluminoferrite ($4CaO.Al_2O_3.Fe_2O_3$): | 5–10 |
| Calcium sulfate ($CaSO_4$): | 2–4 |
| Calcium oxide (free CaO): | 0.5–1.0 |
| Magnesium oxide (free MgO): | 2–4 |
| Ignition Loss | 0.5–2.0 |

The "aggregate" is any combination of clear particulate natural minerals, such as crushed stone, sand, or the like, but does not include any substantial amount of soil or dirt. In addition, the "aggregate" may include man-made components such as rubber powders, glass beads, micro balloons, resin foams, plastic particles, fiberglasses or various metal shapes. Additional particulate additives include transition metals and metalloids as their as their elemental forms, as their inorganic salts and as their oxides. Preferred metal particulates include iron, taconite, manganese, chromium, aluminum, iron oxide, zinc, vanadium, titanium, lead, bismuth, uranium, boron salts, and silicon oxides. Particulate minerals such as talc taconite, soapstone, zeolites, and the like can also be added. Additional particulate includes ground weight plastics such as particulates formed from plastic bottles, plastic fibers, and plastic films. These materials serve at least as aggregates and in addition can provide extra flexibility to the cementitious composition. The metals, metal salts and metal oxides in appropriate instances can contribute additional strength and impermeability to the cementitious composition.

The "fly ash" is the particulate, non-combustible by-product of various combustion processes, including without limitation, the burning of coal, refuse and other combustible materials. The addition of fly ash to the dry cement and the aggregate is optional in the present invention.

An improved cementitious composition of the invention is based upon the combination of the basic ingredients for the cementitious composition and particulate elemental carbon. The elemental carbon may be in the powdered charcoal, carbon fibers, carbon black, lamp black, chimney soot, graphite, bone black, and the like.

It has been discovered that the combination of particulate elemental carbon with the basic cementitious composition produces a material displaying astounding structure and results. The structure of this composition appears glassy rather than powdery or gritty when it is microscopically examined in cross-section. Microscopic structures that are not present in ordinary concrete or in the basic cementitious composition are present in this improved composition containing particulate carbon. It is believed that the particulate carbon causes a greater linking between the aluminosilicate molecules and organic molecules of the tar as well as causes a superior degree of hydration of the aluminosilicate relative to ordinary concrete. Upon examination by a scanning electron microscope, the composition is composed of an intimate combination of hydrated aluminosilicate crystals and the organic material. In addition, there appear fine filaments spread throughout the matrix of the aluminosilicate/organic material. The fine filaments have the appearance of needles or straw and are almost uniformly approximately 1–4 microns long and approximately 1/10ths of a micron wide. The fine filaments do not appear in the air voids of the cementitious matrix. In contrast to be the case if they were a detrimental impurity such as ettringite, these filaments appear to be independent crystalline structures present throughout the matrix but not within the air cells.

The proportions of all ingredients except particulate carbon in the particulate carbon improvement of the cementitious composition are the same as in those described for the basic cementitious composition (to make a total percentage weight of the composition as 100% to 104%). In addition, between 0.01%-wt and about 5%-wt elemental carbon is added to the cementitious composition. The carbon may be in addition to all other aggregates or may be substituted for a portion of the aggregate and/or fly ash.

The process for preparing the improved elemental carbon cementitious composition follows the same procedure outlined for the basic cementitious composition. The elemental carbon may be combined with the premix for addition to the cement dry mixture or may be combined with the cement dry mixture before the aqueous premix material is added to added to the completed mixture of premix and dry components.

A particularly preferred formulation of the present composition is formed from a combination of ingredients including about 3000–3100 pounds of aggregate, about 450–550 pounds of dry "Portland" cement, about 80–110 pounds fly ash, and about 240–260 pounds of water treated with the tar component comprising from about 5.0–8.0 weight percent of the aqueous premix. Furthermore, the water used to form the aqueous premix should preferably be treated with sodium tripolyphosphate (STP) so as to retain about 5 to 50, especially 18–21 parts per million of residual STP.

The present composition may also be mixed as a castable cementitious composition. These compositions generally contain more dry Portland cement than the usual poured compositions, and are used commercially, for example, for manufacturing culverts. When a casting composition is formed from aqueous premix according to the present invention, it is believed that the amount of dry Portland cement needed may be less than the typical amount employed. When a typical amount (e.g., about 9 to 30 weight percent) of dry Portland cement is employed in combination with aqueous premix, the resulting mixture becomes too thick to cast. Thus, an effective high flexural-strength castable cementitious composition according to the present invention may be formed by employing about 8–20 weight percent dry Portland cement, about 5–20 weight percent aqueous premix, about 0–85 weight percent aggregate, and optionally about 0–50 weight percent fly ash.

The manner in which the aqueous premix modifies the macromolecular structure of the cementitious composition so as to increase the flexural and tensile strength relative to ordinary concrete is not known. While they are not intended as limitations or parameters of the present invention, several theories may explain this phenomenon, however. Inasmuch as the non-polar organic tar component and the electrostatically interactive inorganic complex salt cementitious component are immiscible, it is believed that the action of the emulsifier system and the preferred STP produces a highly dispersed amorphous tar component within the greater proportion of semicrystalline cementitious component. The tar dispersion has colloidal or macrocolloidal dimensions so that the resulting structure is composed of highly disperse macromolecular domains of the tar component throughout the reticulated semicrystalline matrix of the calcium aluminosilicate cementitious component. The domains elasticize the faults of the matrix so that mechanical and thermal stresses on the matrix become dissipated by the "give" of the organic domains. It is also possible that the pi electron orbitals of the polyaromatic compounds in the tar domain interact as induced dipoles with the electrostatic charges of the inorganic matrix. The emulsifier system and especially the STP may facilitate this dipolar interaction. The result is a remodeling of the matrix faults so that mechanical and thermal stress is dissipated as mentioned above.

The present invention also provides a process for manufacturing a shaped article. The initial step in the process involves treating water first with the emulsifier system and then with the tar component. The proportion of emulsifier system is about 0.05 to about 15.0 weight percent, more preferably about 0.1 to about 12 weight percent, most preferably about 1 to about 10 weight percent relative to the weight of the premix. The proportion of the tar component is from about 0.1-25.0 weight percent, preferably 5.0-12.5 weight percent, and most preferably about 7.0-9.0 weight percent of the aqueous premix. In addition, the water should be preferably treated with an excess amount of sodium tripolyphosphate (STP). The "excess amount" is enough to provide a residual amount of STP in the water in addition to the amount that softens the water by solubilizing the metal salts present therein. This residual amount of STP can be from about 0.5-180 parts per million parts of the aqueous premix, preferably about 5-50 ppm, more preferably about 15-22 ppm, and most preferably about 18-21 ppm. However, amounts exceeding approximately 180 to 250 ppm of residual STP should be avoided. It is believed that these higher amounts of STP begin to cause other reactions in the cementitious composition which can lead to its eventual breakdown or decomposition.

Following the addition of the tar component, emulsifier system, and preferably STP, the aqueous premix is mixed with dry, cementitious ingredients which include dry cement, aggregate, and optional fly ash to form a fluid cementitious mixture or paste. Mixing may be performed by any means and for any length of time which results in the formation of an evenly mixed, homogenous mixture, but most typically is performed by means of a rotating drum arrangement such as an industrial cement mixer. The typical mixing time for a 4000 pound batch of cement is about 90 seconds when the concrete is mixed in a batching plant, and about 9 minutes when the mixing occurs in a truck having a rotating drum.

When STP is added to the aqueous premix containing the tar component and emulsifier system, the aqueous premix must be mixed with the dry cement, aggregate, and optional fly ash within a period of time effective to prevent a substantial reduction of the flexural, tensile and shear-bond strength-enhancing, and other beneficial effects of the STP in the aqueous premix. Preferably, the aqueous premix is mixed with the dry cement, aggregate, and optional fly ash within about 4 days from the addition of the STP to the water.

Although the reasons for the decrease in flexural, tensile and shear-bond strength-enhancement, and other beneficial effects, after this effective time period has lapsed are not known, a possible explanation is that after this period, the STP begins to undergo a hydrolysis reaction and breaks down to its mono- and disodium precursors. Alternatively, the STP may undergo a polymerization reaction or structural transformation to a cyclic polyphosphate, such as sodium trimetaphosphate or sodium tetrametaphosphate. Regardless of the mechanism responsible, after the effective period of time for addition of the aqueous premix to the dry cement, aggregate, and optional fly ash has lapsed, it is believed that the cement compositions prepared begin to lose their enhanced properties according to the present invention.

While the cementitious compositions of the present invention can be formed without STP, it is believed that utilization of STP promotes a more thorough dispersion of the tar components within the matrix of the compositions. Furthermore, it is believed that the homogenous dispersion provided by the incorporation of STP into the aqueous premix contributes to the enhanced properties shown by the cured compositions. Accordingly, to obtain optimal increases in flexural, tensile and shear-bond strength, as well as the other beneficial properties of the compositions of the present invention, sufficient STP should be utilized in forming the aqueous premix, such that the preferred residual amounts disclosed herein remain after incorporation of the STP.

When the aqueous premix and dry cement, aggregate, and optional fly ash have been sufficiently mixed so as to form a homogenous mixture, the fluid cementitious mixture or paste can then be poured into any suitable casing, shell, or mold, shaped according to the desired form of the article to be manufactured. The cementitious mixture is then allowed to harden until substantially solidified, preferably at room temperature for at least 1 day.

The cementitious compositions of the present invention will exhibit comparable to significantly greater compression strength, and substantially greater flexural, tensile and shear-bond strength, as measured in pounds per square inch (psi) of force applied, than standard concrete compositions prepared from the same amounts of ingredients but with water that is free of a tar component, its associated emulsifier system and residual sodium tripolyphosphate. Specifically, the compression strength of the cementitious compositions of the present invention will range from comparable values of those of standard concrete, up to substantially greater compressive strengths depending upon the amount of tar component and emulsifier system incorporated into the compositions of the present invention. Furthermore, the superior elastic properties of the present compositions will be reflected in an about 1-250 percent greater flexural strength, and an about 2-200 percent greater tensile strength than those of standard concrete. More preferably, the compositions of the present invention will exhibit an about 20-200 percent, and most preferably 25-150 percent greater flexural strength than standard concrete. In addition, more preferred tensile strengths of 30-175 percent, and most preferably of 40-150 percent will be exhibited by the cementitious compositions of the present invention.

Also, the strength of the adhesive bond between the cementitious compositions of the present invention and the subsurface over which they are laid will be reflected in a shear-bond strength which is from about 5-350 percent greater, preferably 10-250 percent, and most preferably about 20-200 percent greater than that observed between standard concrete adhered to an appropriate subsurface. In fact, the adhesive bond between the present compositions and an appropriate subsurface is such that the matrix of the cured cementitious composition will generally crack and break before the bond between the composition and subsurface is overcome.

The superior flexural and tensile strength of the cementitious compositions of the present invention will further result in a highly wear resistant material. For example, when compared to a standard concrete prepared from the same ingredients, but with water free of a tar component, its associated emulsifier system and residual sodium tripolyphosphate, the compositions of the present invention will exhibit significantly less weight loss due to abrasion, and an impact strength which is about 10–500 percent greater, preferably 100–400 percent greater, and most preferably 200–350 percent greater than that of a standard concrete.

The compositions of the present invention will also be substantially less permeable than comparable standard concretes. Thus, the cementitious compositions of the present invention are significantly more durable than standard concretes, based at least in part, on their enhanced ability to resist the transportation and retention of water and harmful soluble salts, such as chlorides and phosphates, through the matrix of the cured compositions. While not being held to a theory of operation, one possible explanation for the decreased permeability of the compositions of the present invention is that dispersed pore structure of the cured compositions may be partly filled or sealed by the hydrophobic, dispersed domains of tar component within the matrix of the cured compositions. Also, it is believed that these same dispersed domains formed by the tar component tend to inhibit and limit the formation of microcracks in the cementitious matrix, thereby reducing the intake and transportation of water and soluble salts into the cured matrix of the composition.

Standard concretes often require the addition of various air entrainment additives to ensure that the cured product develops a proper pore structure. On the other hand, latex modified concretes usually entrain substantially too much air, and accordingly must be treated with anti-foaming agents. In contrast, the cementitious compositions of the present invention are self air-entraining, and form a more uniform dispersion of air throughout the cement paste. Specifically, the present compositions will entrain from about 4–15 percent air, preferably 5–12 percent, and most preferably 6–9 percent air without the incorporation of any additives.

In addition to superior physical properties, the cementitious compositions of the present invention are significantly easier to work with than many standard cement compositions. This enhanced workability provides cost advantages both with respect to significantly reduced labor costs, as well as a substantial reduction in wasted materials which must be replaced due to improper working. Specifically, the compositions of the present invention do not "bleed" excess water to the surface when being mechanically screeded or hand troweled, and present a "cream" or "paste" which can be worked to a smooth finish substantially faster than standard concretes. In addition, the surface of the present compositions are less likely to be overworked than conventional concretes. In contrast, overworking of the surface of standard concrete results in a nondurable, powdery cured surface which must be removed and replaced, thereby resulting in significantly increased labor and materials costs.

In addition to the properties discussed above, the cementitious compositions of the present invention may also exhibit substantially improved freeze/thaw, corrosion and skid resistance, as well as decreased drying shrinkage and increased fatigue strength when compared to standard concrete compositions prepared from the same amounts of ingredients but with water that is free of a tar component, its associated emulsifier system and residual sodium tripolyphosphate. Furthermore, it will be appreciated that while the comparisons between the cementitious compositions of the present invention and standard concrete have been made with reference to the preferred compositions made with an aqueous premix of water, an emulsified tar component and residual sodium tripolyphosphate, that the enhanced properties of the compositions of the present invention are maintained in a composition made with a premix lacking residual sodium tripolyphosphate, albeit at somewhat reduced levels over the properties exhibited by the preferred compositions.

The improved particulate carbon containing cementitious composition of the present invention displays all of the foregoing processing properties as well as improved flexural and tensile strengths. In addition, the improved particulate carbon cementitious composition displays astounding compressive strength and air void structure results. In 5-day and 28-day compressive strength tests for a standard cast cylinder of ordinary concrete and a standard cast cylinder of the improved cementitious composition of the present invention, the following results were observed.

TABLE 1

| cylinder break (psi) | 5 day break (psi) | 28 day |
|---|---|---|
| Standard Concrete | 2,000–3,000 | 4,500–5,800 |
| Improved Particulate C Composition | 5,200–5,800 | 7,000–8,200 |

A microscopic examination of a standard concrete in comparison to the particulate carbon cementitious composition revealed unique air void structures for the latter. The particulate carbon cementitious composition displayed a smaller and more complete air void structure than the standard concrete form. Air incorporation was on the order of between 6–8%, e.g., 7%. The air voids appeared to be evenly spaced throughout the material and were more complete, and smaller than those in standard concrete. The more complete air void structure is especially apparent in the uniform distribution and uniform isolation of the individual air cells. The air void structure present in the improved particulate carbon cementitious composition translates into a better freeze/thaw performance and better resistance toward water permeability than either standard concrete or the basic cementitious composition prepared without the standard carbon additive. In addition, the improved particulate carbon cementitious composition displays less water penetration and less salt attack than either standard concrete or the basic cementitious composition without particulate carbon.

Preferably, the aqueous premix used in the invention contains a high concentrate of organic solids. The tar component is approximately doubled to tripled relative to the preferred concentration present according to the basic cementitious composition. Thus, to form the aqueous premix, the percent solids in the aqueous premix is raised from a typical 18% to approximately 30–60% solids. The remaining weight percentage is composed of water and the liquid emulsifier system. The solids can include the tar component alone or the tar component in combination with the secondary emulsifier such as the clays. The weight percentage of this aqueous premix in the total composition remains the same.

The invention will be further described by reference to the following working example.

EXAMPLE 1

Four formulations of the cementitious compositions according to the present invention were prepared by mixing the following ingredients to make 6 yard batches. The amounts stated are per yard of the prepared compositions.

Formulation A 513 pounds dry Portland cement (Northwestern States Portland Cement, Mason City, Iowa);

250 pounds water (well water, ambient temperature, 100–240 ppm hardness) treated with a 50% solids coal tar emulsion (a composition of 25 wt % commercial coal tar, 25 wt % kaolin and bentonite clay, about 12 to 14 wt % of a mono, di or tri sulfonic acid derivative of a fatty acid or alcohol and a remainder of water, sold as "Twin Seal", St. Paul, Minnesota), such that 5.0 percent by weight of the aqueous premix, or 0.32 percent by weight of the total composition, is emulsified coal tar, and an excess of $Na_5P_3O_{10}$ (industrial-grade water treatment STP) to give a residual concentration of 20 ppm;

3054 pounds aggregate (1818 pounds 0.375 diameter washed stones; 1236 pounds fine sand); and 91 pounds fly ash (Class "C" fly ash from a coal-fired electric power plant).

Formulation B 513 pounds dry Portland cement;

250 pounds water treated with a 50% solids coal tar emulsion (the "Twin Seal" Composition of Formulation A), such that 6.25 percent by weight of the aqueous premix, or 0.40 percent by weight of the total composition, is emulsified coal tar, and an excess of $Na_5P_3O_{10}$ to give a residual concentration of 20 ppm;

3054 pounds aggregate; and 91 pounds fly ash.

Formulation C 513 pounds dry Portland cement;

250 pounds water treated with a 50% solids coal tar emulsion (the "Twin Seal" Composition of Formulation A), such that 8.33 percent by weight of the aqueous premix, or 0.54 percent by weight of the total composition, is emulsified coal tar, and an excess of $Na_5P_3O_{10}$ to give a residual concentration of 20 ppm;

3054 pounds aggregate; and 91 pounds fly ash.

Formulation D 513 pounds dry Portland cement;

250 pounds water treated with a 50% solids coal tar emulsion (the "Twin Seal" Composition of Formulation A), such that 12.5 percent by weight of the aqueous premix, or 0.80 percent by weight of the total composition, is emulsified coal tar, and an excess of $Na_5P_3O_{10}$ to give a residual concentration of 20 ppm;

3054 pounds aggregate; and 91 pounds fly ash.

Upon mixing, each of the formulations resulted in a homogenous, gray amorphous cementitious material.

Where necessary, if any of the mixtures was drier or thicker than desired, 1–3 extra gallons of water was added to the entire 6 yard batch to improve the texture of the material as is a matter of course in the concrete industry.

When wet, each of the formulations behaved similarly, with very few perceptible differences. In general, formulations A-D took on an increasingly darker gray coloration, due to a progressive increase in the tar content from formulation A to D. Also, there was a progressive increase in the tackiness, and a decrease in the setting times, as the tar content of the formulations increased. However, all the formulations, regardless of the tar content, worked very quickly, with no water bleeding, and displayed the other enhanced workability characteristics described above.

Many of the formulations set to hard, durable surface in a substantially shorter period of time than would be required for standard or latex-modified concrete. In fact, formulation D set so rapidly that it was capable of holding the weight of vehicles, without significant deformation, within four hours after being poured.

Each of the formulations was capable of sustaining significant deformation prior to cracking and breaking. The flexural and tensile strengths of cured formulations A and B was further confirmed by the ability of thin slabs, varying between ¼ to 2 inches in thickness, to withstand repeated exposure to 50,000+ pound trucks for over a year without substantial wear or breakage. In contrast, similar thickness slabs of a standard concrete mixture were destroyed by the pounding of the trucks in a matter of a few weeks.

The invention has been described with reference to various specific and preferred embodiments and techniques. However, it should be understood that many variations may be made while remaining within the spirit and scope of the invention.

EXAMPLE 2

A formulation of the improved elemental carbon cementitious composition according to the present invention was prepared by mixing the following ingredients to make a six-yard batch. The amounts stated are per yard of the prepared formulation. Formulation:

500 pounds dry Portland cement (Northwestern States Portland Cement, Mason City, Iowa);

About 180–265 pounds of premix composed of approximately 25% of a coal/tar emulsion containing about 60% solids relative to the total weight of the emulsion and approximately 75% water. The coal/tar emulsion is essentially as described in Formulation A of the first example;

About 2412 pounds of aggregate, including approximately 1200 pounds of 0.375 diameter washed stones, about 1212 pounds of sand, and about 100 pounds of Class C fly ash; and About 9–10 pounds of chimney soot particulate carbon.

The particulate carbon is added to the dry mix of Portland cement/aggregate and the aqueous premix is then added. The aqueous premix contains approximately 40 ppm of residual STP. The formulation is mixed to a homogeneous black morphous cementitious material containing the particulate carbon.

The pouring and setting properties of the improved particulate carbon cementitious composition are approximately the same as the basic cementitious composition, with the exception that the improved composition creams faster than the basic composition.

Upon a 5-day set, the improved particulate carbon cementitious composition had a strength similar to that of a 28-day cured standard concrete. Upon curing 28 days, the improved cementitious composition displayed a compression strength approximately 200-300% better than standard concrete.

The improved cementitious composition can be cast into shaped articles such as building blocks, walls, curbing, and support structures. The poured improved cementitious composition as well as its cast-shaped articles display superior compressive and resistive strength relative to standard concrete mixtures.

What is claimed is:

1. A cementitious composition formed from a combination of ingredients, comprising:
   a) about 0-85% wt-% aggregate;
   b) about 7-90 wt-% dry cement;
   c) about 0-50 wt-% fly ash;
   d) about 3-10 wt-% aqueous premix; and
   e) about 0.01-4 wt-% elemental carbon particulate;
   wherein the aqueous premix is a highly dispersed mixture of water, an emulsifier system, and a tar component; the tar component is from about 0.1-50 wt-% of the aqueous premix, the aqueous premix contains from about 0.5 to about 500 ppm of residual sodium tripolyphosphate, and the weight percentages of ingredients (a)-(e) are relative to the total weight of the composition.

2. A composition according to claim 1 wherein the ingredient weight percentages are selected from about 30-85 wt-% aggregate, about 7-70 wt-% dry cement, about 1-30 wt-% fly ash, about 6-9 wt-% aqueous premix, and about 0.05 wt-% elemental carbon particulate.

3. A composition according to claim 1 wherein the aqueous premix contains from about 10 to 60 ppm of residual sodium tripolyphosphate.

4. A composition according to claim 1 wherein the tar component is about 10-50 wt-% of the aqueous premix.

5. A composition according to claim 1 which is formed from a combination of ingredients comprising;
   a) about 75-80 wt-% aggregate;
   b) about 10-15 wt-% dry cement;
   c) about 2-3 wt-% fly ash;
   d) about 6-9 wt-% aqueous premix; and
   e) about 0.2-1.5 wt-% elemental carbon particulate.

6. A composition according to claim 1 wherein the tar component comprises a bituminous material selected from the group consisting of petroleum asphalt, native asphalts, coal tars, oil tars, pitches, tall oil pitches, pyrogenous tar distillates of water, gas, wood, peat, bone, shale, resin, fatty acid, and combinations thereof.

7. A composition according to claim 1 wherein the emulsifier system comprises a primary emulsifying agent selected from the group consisting of an anionic emulsifier, a cationic emulsifier, a non-ionic emulsifier, and combinations thereof.

8. A composition according to claim 7 wherein the emulsifier system is a combination of a primary emulsifying agent and a secondary agent composed of a shear-dispersing clay.

9. A composition according to claim 8 wherein the combination further includes a mineral acid or base.

10. A composition according to claim 6 wherein the tar component is coal tar.

11. A composition according to claim 7 wherein the primaryemulsifying agent is a combination of one or more anionic, cationic, non-ionic and amphoteric emulsifiers.

12. A composition according to claim 7 wherein the primary emulsifying agent is a combination of an anionic emulsifier composed of a monoditrisulfonate derivative of a fatty acid or alcohol.

13. A composition according to claim 1 which is self-air training.

14. A process for increasing the flexural, tensile, and shear-bond strength while decreasing the water permeability of a cement composition comprising forming the cement composition from a combination of dry cementitious ingredients, an elemental carbon particulate and an aqueous premix containing water, an emulsifier system, a tar component and residual sodium tripolyphosphate.

15. A shaped article composed of a cured cementitious composition obtained by combining about 0-85 wt-% aggregate, about 7-90 wt-% dry cement, about 0-50 wt-% fly ash, about 3-12 wt-% aqueous premix, and about 0.01-4 wt-% elemental carbon particulate, wherein the aqueous premix is a highly dispersed mixture of water, an emulsifier system, a tar component, and residual sodium tripolyphosphate, the tar component is from about 0.1 to about 50 wt-% of the aqueous premix, and the weight percentages of the ingredients are relative to the total weight of the wet composition.

16. A composition according to claim 6 wherein the emulsifier system comprises a combination of nonionic polyethers and sorbitan sulfate materials.

17. A cementitious composition according to claim 6 wherein the emulsifier system comprises a combination of nonionic and anionic surfactants, the anionic surfactants being organic tensides and sulfonated lignin materials.

18. A composition according to claim 1 wherein a portion of the water, emulsifier system and tar component of the aqueous premix are obtained from a driveway sealer.

* * * * *

UNITED STATES PATENT AND TRADEMARK OFFICE
CERTIFICATE OF CORRECTION

PATENT NO. : 5,236,500
DATED : August 17, 1993
INVENTOR(S) : John F. Schneider et al It is certified that error appears in the above-indentified patent and that said Letters Patent is hereby corrected as shown below:

Column 1, line 10 and 11, please delete "and will issue as" and insert therefor --now--.

Column 1, at end of line 11, please delete "dated May 26, 1992".

Column 17,

Claim 1, line 18, please delete "%", first occurrence.

Claim 1, line 22, please delete "4" and insert therefor --5--.

Column 18,

Claim 15, line 36, please delete "4" and insert therefor --5--.

Signed and Sealed this

Fifth Day of July, 1994

*Attest:*

BRUCE LEHMAN

*Attesting Officer*  *Commissioner of Patents and Trademarks*